(12) United States Patent
Handy

(10) Patent No.: US 10,150,623 B2
(45) Date of Patent: Dec. 11, 2018

(54) CLEANING APPARATUS

(71) Applicant: Keith David Handy, Stone (GB)

(72) Inventor: Keith David Handy, Stone (GB)

(*) Notice: Subject to any disclaimer, the term of this patent is extended or adjusted under 35 U.S.C. 154(b) by 0 days.

(21) Appl. No.: 15/623,216

(22) Filed: Jun. 14, 2017

(65) Prior Publication Data

US 2017/0362037 A1 Dec. 21, 2017

(30) Foreign Application Priority Data

Jun. 16, 2016 (GB) .................................. 1610480.4

(51) Int. Cl.
| | | |
|---|---|---|
| *B05B 3/02* | (2006.01) | |
| *B65G 45/22* | (2006.01) | |
| *B25J 11/00* | (2006.01) | |
| *B08B 3/02* | (2006.01) | |

(52) U.S. Cl.
CPC .............. *B65G 45/22* (2013.01); *B05B 3/02* (2013.01); *B08B 3/022* (2013.01); *B08B 3/024* (2013.01); *B25J 11/0085* (2013.01); *B08B 2230/01* (2013.01)

(58) Field of Classification Search
CPC ...................................................... B65G 45/22
USPC .................................................. 198/494, 495
See application file for complete search history.

(56) References Cited

U.S. PATENT DOCUMENTS

| | | | | |
|---|---|---|---|---|
| 3,510,352 A | * | 5/1970 | Neuman ................... | B60S 3/04 134/181 |
| 3,545,460 A | * | 12/1970 | Daum ...................... | B60S 3/04 134/123 |
| 4,172,463 A | * | 10/1979 | Woolley ............... | A47L 15/4209 134/176 |
| 5,129,956 A | * | 7/1992 | Pickering ................ | B05B 1/262 134/129 |
| 5,524,654 A | | 6/1996 | Nakano | |
| 5,706,932 A | * | 1/1998 | White .................... | B65G 45/22 15/302 |
| 6,244,423 B1 | * | 6/2001 | Tacchi .................... | B08B 3/022 198/493 |
| 7,044,287 B1 | | 5/2006 | Gray | |
| 9,032,976 B2 | * | 5/2015 | Berntsen ................ | B65G 45/22 134/124 |

(Continued)

FOREIGN PATENT DOCUMENTS

| | | |
|---|---|---|
| CN | 105127124 A | 12/2015 |
| CN | 205146766 U | 4/2016 |
| CN | 106733830 A | 5/2017 |

(Continued)

OTHER PUBLICATIONS

UKIPO Search Report dated Jan. 31, 2017, for GB Patent Application No. 1610480.4, 1 page.

(Continued)

*Primary Examiner* — William R Harp
(74) *Attorney, Agent, or Firm* — Han Santos, PLLC; Elliott Y. Chen

(57) ABSTRACT

A cleaning apparatus includes a connection part rotatably mounted to a rotatable member. The connection part is in the form of a disc 36 of plastics material, with a central cavity with four radial passages extending therefrom leading to nozzles for steam to pass therethrough for cleaning purposes. In use the disc is rotated at a required speed to, for instance, clean a conveyor.

18 Claims, 6 Drawing Sheets

(56) References Cited

U.S. PATENT DOCUMENTS

2004/0026213 A1\* 2/2004 Blue ................ B65G 45/22
198/495
2006/0255176 A1 11/2006 Yeiser

FOREIGN PATENT DOCUMENTS

GB         2363369 A    12/2001
JP       2011173080 A     9/2011

OTHER PUBLICATIONS

UKIPO Search Report dated Dec. 8, 2017, for GB Patent Application No. 1709051.5, 4 pages.

\* cited by examiner

CLEANING APPARATUS

TECHNICAL FIELD

This invention concerns cleaning apparatus, and for instance cleaning equipment incorporating such apparatus for use in cleaning conveyors.

BACKGROUND

Cleaning apparatus using fluids are used in a wide range of applications including for instance cleaning conveyors such as for example may be used in food production. It is often required for such apparatus to clean a relatively large area and to spray cleaning fluids over this area.

To provide coverage over such an area it is often required to provide moving components in the equipment, often including for instance spinning arms. Such arms can however produce difficulties and hazards during use, with the arms potentially contacting people and/or objects and possibly causing damage or injury, and particularly when the arms are spinning fast. Such arms can become unbalanced which may be particularly problematic at high speeds.

SUMMARY

According to a first aspect of the invention there is provided cleaning apparatus, the apparatus comprising a connection part permitting connection to a supply of cleaning fluid, and a rotatable member rotatably movable relative to the connection part, the rotatable member being in the form of a disc with an opening within the disc in connection with the connection part to receive cleaning fluid therefrom, with one or more outlets extending from the opening in the disc, to the exterior of the disc, to supply cleaning fluid to an area or item to be cleaned.

The rotatable member may include a central opening with one or more passages extending therefrom, with the or each outlet extending from a passage. A plurality of substantially radial passages may be provided, and at least one outlet may be provided extending from each passage. In one embodiment four equispaced radial passages are provided. The outlets may be in the form of nozzles to supply a jet of fluid. The nozzles may be configured such that fluid passing therethrough will cause rotation of the rotatable member.

In one arrangement, the rotatable member may be driven. A gear may be provided on the rotatable member drivable by a motor, which motor may be provided on a mounting part of the equipment, and may have a drive gear engageable with the rotatable member gear. The mounting part may be configured to permit selective movement of the apparatus relative to a fixture or mounting assembly.

The rotatable member may be made of a plastics material and may be made of a polymer. The plastics material may have a working surface temperature of at least 230° C. The disc may have rounded edges.

According to a further aspect of the invention there is provided cleaning equipment for conveyors, the equipment comprising a frame locatable extending across the conveyor, and cleaning apparatus according to any of the preceding nine paragraphs mountable on the frame.

The cleaning apparatus may be adjustably mountable on the frame. The equipment may include a supply of steam to the apparatus, for cleaning the conveyor.

According to a still further aspect of the invention there is provided cleaning equipment, the cleaning equipment including a robotic arm, which robotic arm mounts cleaning apparatus according to any of said preceding nine paragraphs.

BRIEF DESCRIPTION OF THE DRAWINGS

Embodiments of the present invention will now be described by way of example only, and with reference to the accompanying drawings, in which.

DETAILED DESCRIPTION

Figure 1:
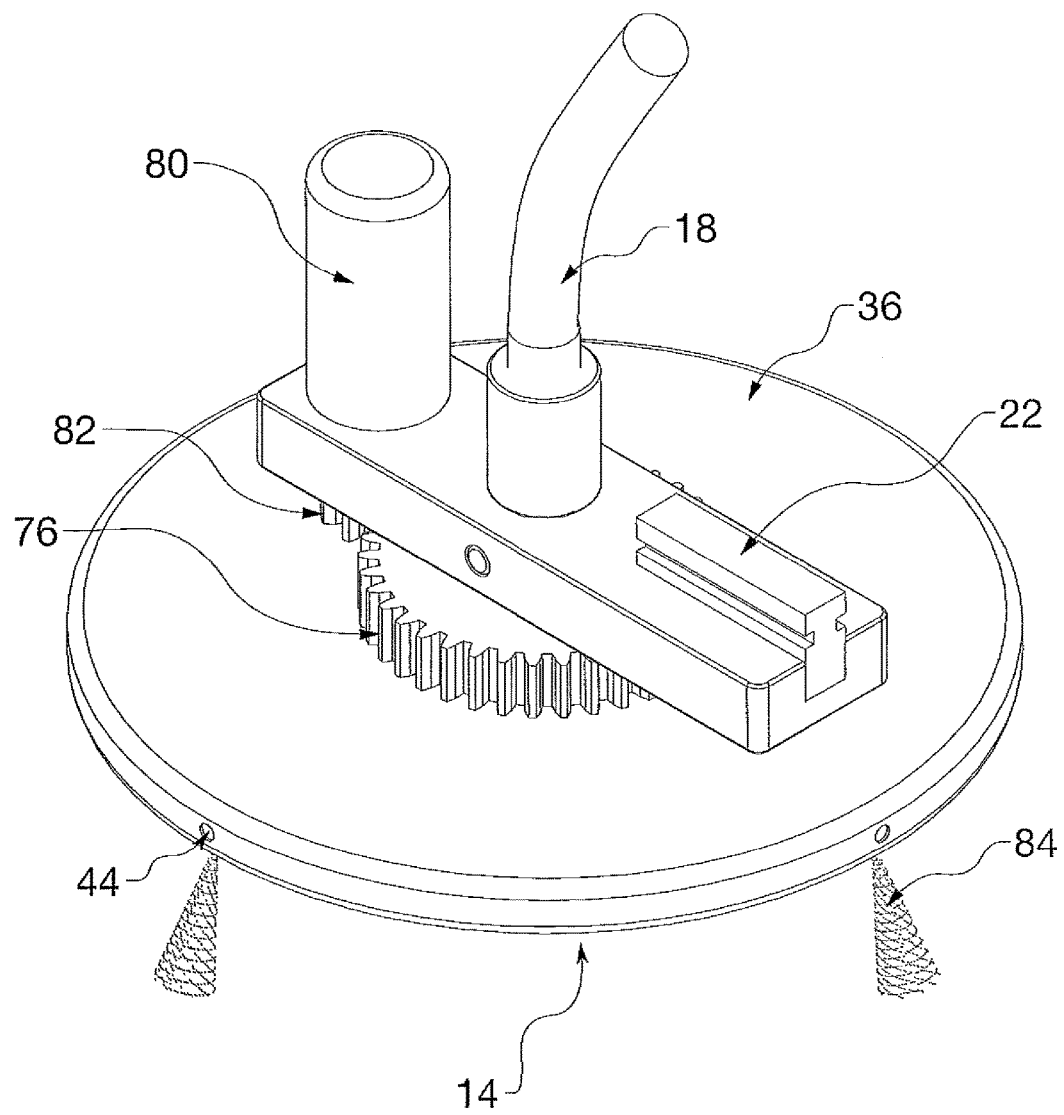
FIG. 1 is a diagrammatic perspective view from above of the cleaning apparatus according to the invention.
Figure 2:
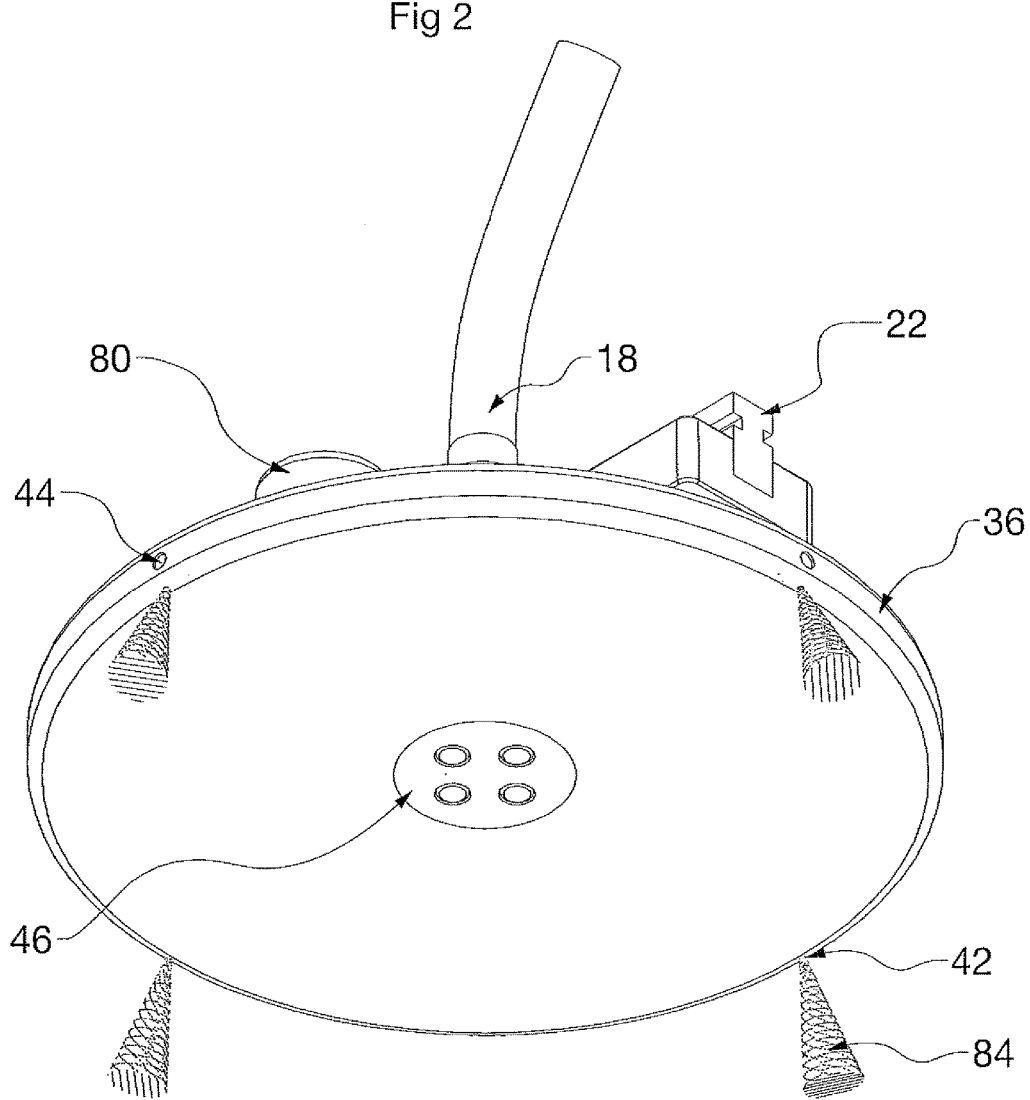
FIG. 2 is a diagrammatic perspective view from beneath of the apparatus of FIG. 1.

The drawings show cleaning apparatus 10 suitable for use for cleaning conveyors as used for example in the food industry. It is to be realized though that such apparatus 10 could be used in a wide range of cleaning environments and applications. The apparatus comprises a connection part 12 rotatably mounted to a rotatable member 14.

The connection part 12 comprises a connecting member 16 mountable to a hose 18 to receive for instance a supply of steam. The connection part 12 is mounted on a frame member 20, which could for example provide a profiled mounting member 22 to permit adjustable mounting on a frame extendable across a conveyor.

The connecting member 16 is in the form of a profiled member with head 24 with a through passage 26, to permit a hose 18 from the steam supply to be mounted thereon. The profiled head 24 connects to a concentric chamber 32, by a cartridge bearing 30 held in place by upper and lower retaining nuts 28.

The rotatable member 14 includes a disc 36 of an engineering plastics material with a typical continuous service temperature range of −100 to 250° C. The disc 36 has a central cavity 38 with four radial passages 40 extending therefrom. A nozzle 42 extends downwardly out of the disc 36 from each passage 40 towards the outer end thereof, and at an outwards inclination. The outer end of each passage 40 is closed by a plug 44.

The lower end of the central chamber in the disc is closed by a metal hub 46, and an annular seal 48 is provided between an upper part of the hub 46 and the surrounding disc 36. The hub 46 has a lower flange 50 which locates in an annular recess in the underside of the disc 36 around the central chamber.

Located above the hub 46 is a profiled axle member 52 with a flange 54 to locate in an annular recess in the top of the rim. An annular seal 56 is provided around the lower inner edge of the flanges 54, to engage with the disc 36. A cylindrical body 58 extends downwardly from the flange 54, and has a groove 60 in a central part of the body 58 to correspond in location with the passages 40 in the disc. The axle member 52 has a central through passage 62 which connects with the groove 60 so as to essentially provide an annular passage for fluid, which passage connects with each of the radial passages 40 in the disc 36.

Figure 3:
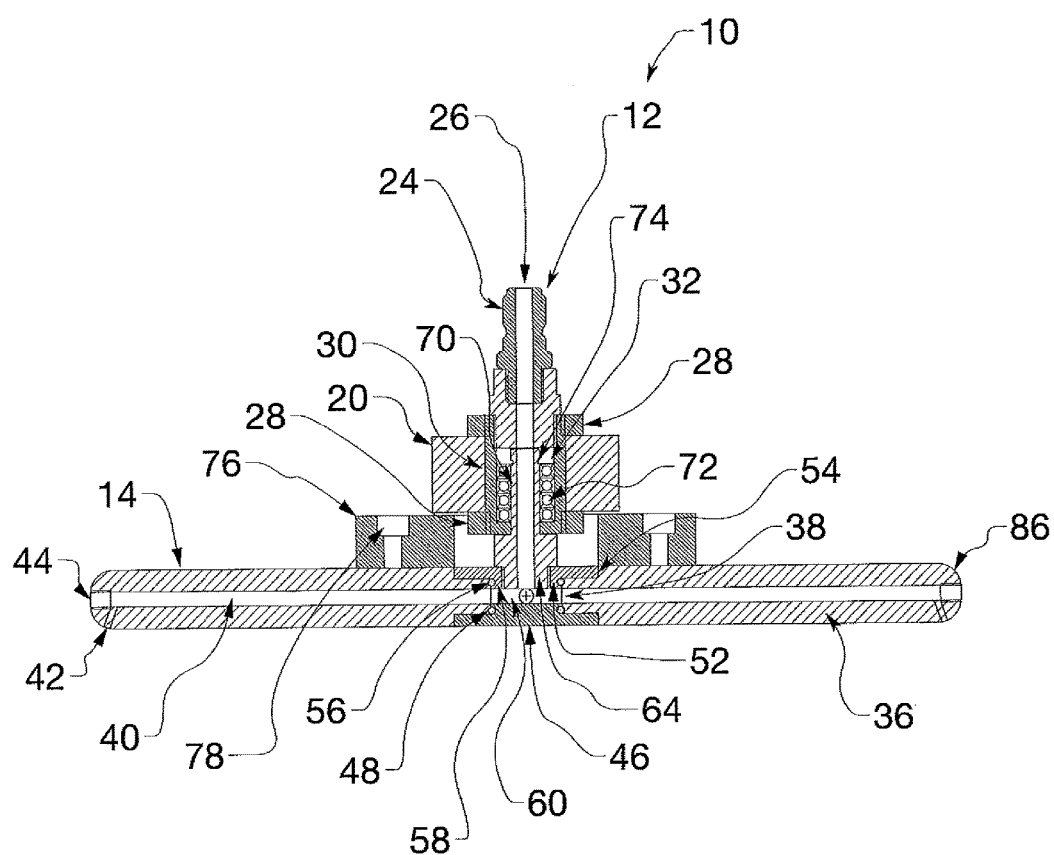
FIG. 3 is a diagrammatic cross-sectional side view of the apparatus of FIG. 1.
Figure 4:
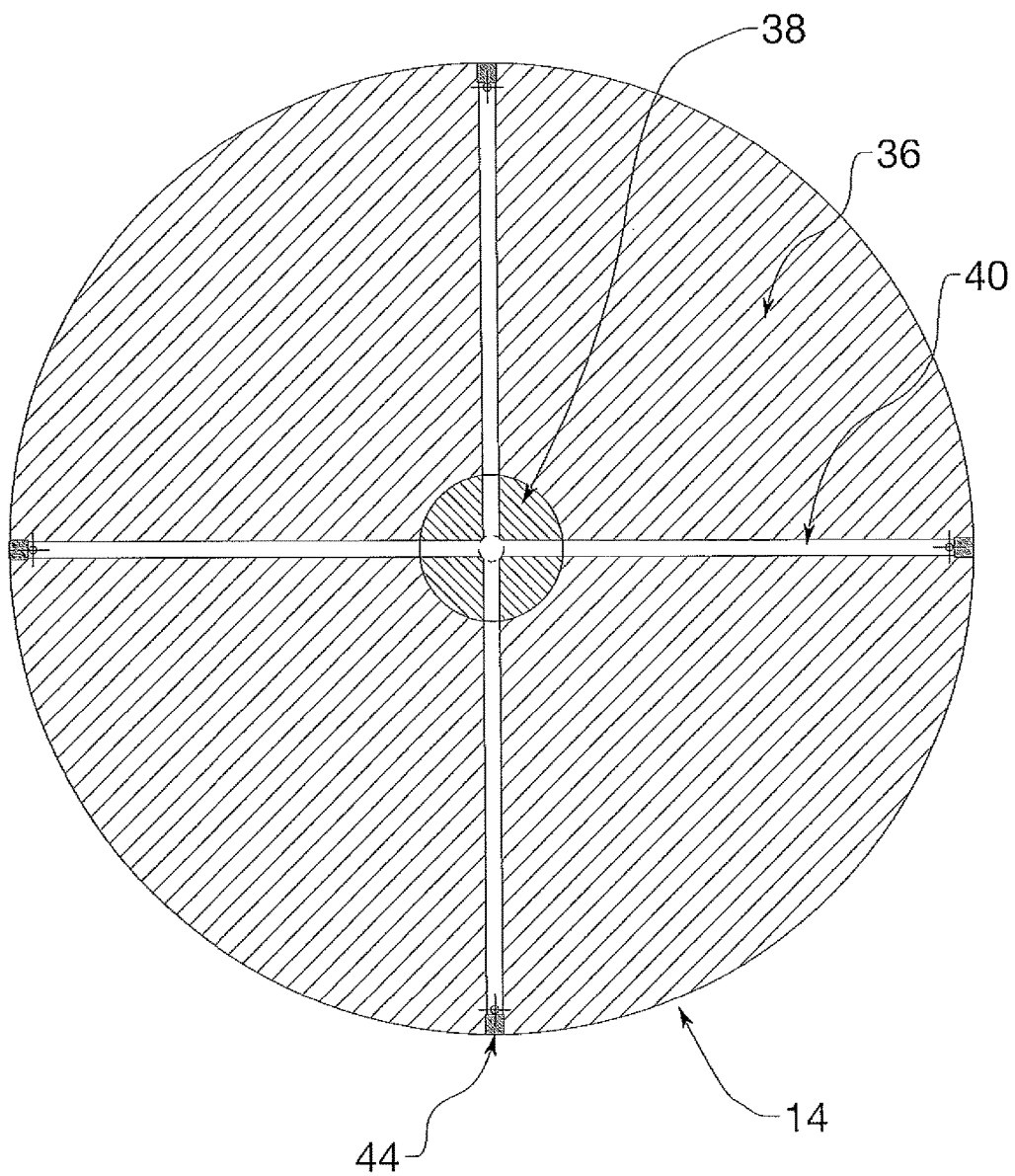
FIG. 4 is a diagrammatic sectional plan view of part of the apparatus of FIG. 1.
Figure 5:
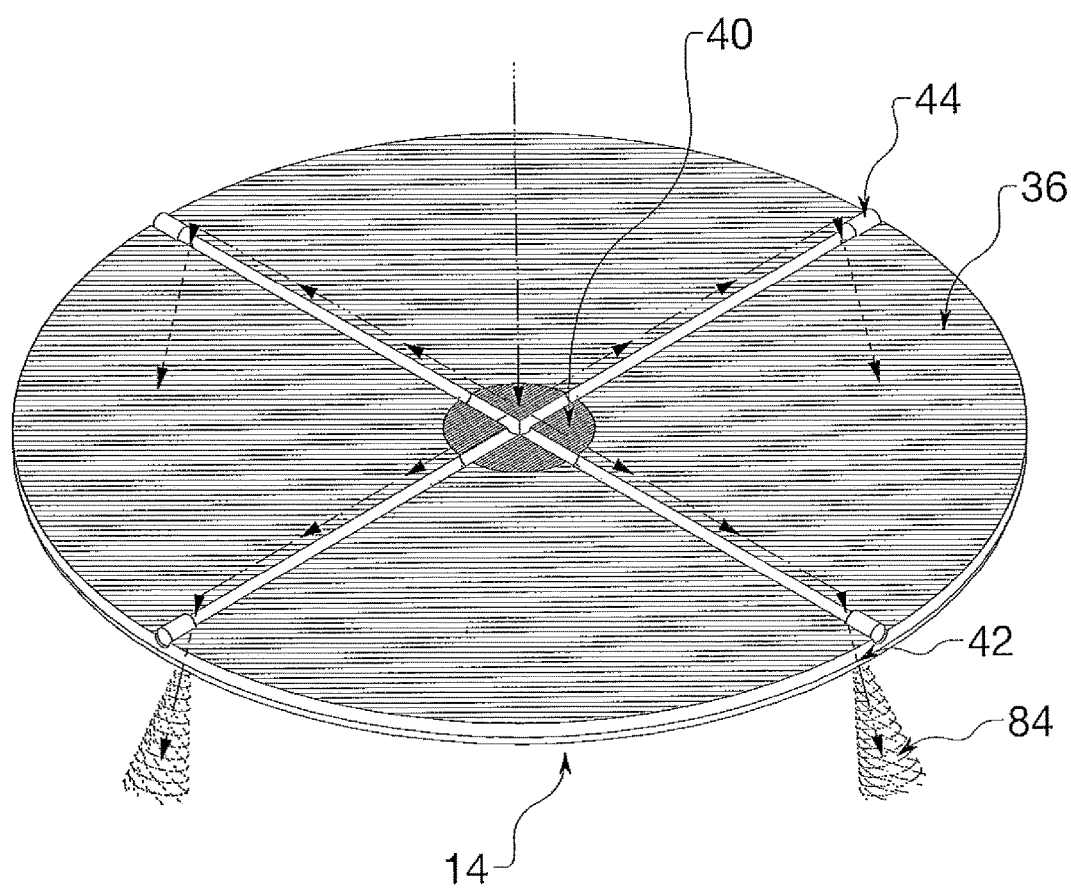
FIG. 5 is a diagrammatic perspective view of part of the apparatus of FIG. 1.

The cartridge bearing includes a first cylindrical section 64 extending upwardly from the flange 54. The first cylindrical section 64 leads to a longer cylindrical section 70 of lesser diameter which includes four annular bearings 72 therearound as shown in FIG. 3. An annular groove 74 above the upper cylindrical part 70 can locate a circlip to retain the bearings 72 in place.

The upper longer cylindrical section 70 of the axle part with the bearings 72 thereon is a sliding fit within the chamber 32 of the connecting part 12. A coaxial gear 76 is provided on top of the disc 36 which surrounds the outer bearing 34, and also partly engages on top thereof and locates in a ring around the outside of the connection part 12 and the gear 76 is held in place by a number of screws 78. This arrangement means that the disc 36, gear 76, axle member 52 and hub 46 can readily rotate relative to the connection part 12 and frame member 20.

An electric motor 80 is provided on an upper part of the frame member 20 connecting to a drive gear 82 located on the underside of the frame member 20, which drive gear 82 is engageable with the gear 76 on the rotatable member 14 to cause rotation thereof.

Figure 6:
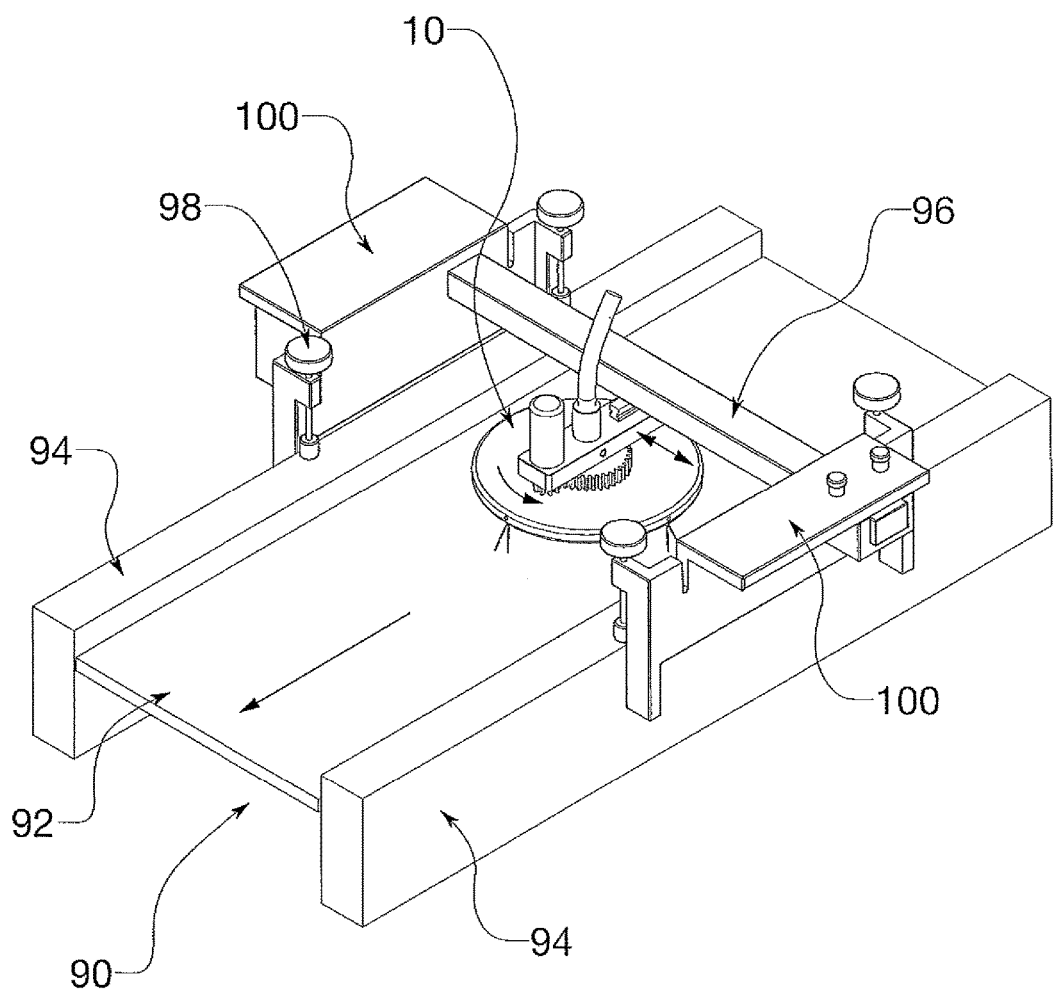
FIG. 6 is a diagrammatic perspective view of part of a conveyor and cleaning apparatus according to the invention.

FIG. 6 shows part of a conveyor arrangement 90 with a belt 92 movingly extending between two side members 94. A cleaning assembly 96 is removably mounted on the conveyor by four adjustable clamp members 98 to engage on each side member 94. The clamp members 98 are mounted on respective brackets 100 and a cross member 102 extends between the brackets 100.

A cleaning apparatus 10 is mounted to the assembly 96 by the profiled mounting member 22 engaging with the cross member 102. In the arrangement shown, the apparatus 10 is located centrally above the belt 92. For a wider belt, the apparatus 10 may be selectively movable along the cross member 102 to permit cleaning of different parts of the belt 92.

In use, steam will enter through the connecting member 16 through the axle member 52 to pass out into the passages 40 and out through the nozzles 42 to provide jets 84 of steam. The rotatable member 14 can be rotated at a required speed, and different speeds may be required for different applications. The cleaning apparatus 10 may be moved relative to the frame member 20, for instance as a conveyor passes thereby, to provide cleaning over a wide area.

As indicated the disc 36 can be rotated at a required speed, but being in the form of a disc will remain balanced when rotating about its axis. The disc 36 will also be relatively safe to the touch having rounded edges 86, and hence is unlikely to cause injury or damage to any person or object it engages against. Using a disc rather than a spinning arm, overcomes the range of potential problems outlined in the third paragraph of the specification above.

Whilst described above in relation to a particular application for cleaning conveyors, it is to be realized that the invention could be used in a wide range of applications, and could for instance be provided on a portable support and used in a hand-held cleaning arrangement. Use of the plastics material means that the disc will essentially not be hot to the touch in case it contacts a person or delicate surface.

In one arrangement, the apparatus may be provided on a robotic arm which permits movement in a plurality of axial directions, so to provide cleaning in a more complex three dimensional pattern.

It is also to be realized that a wide range of other amendments and modifications may be made without departing from the scope of the invention. The disc may be made of different materials, and for instance when using water as a cleaning fluid rather than steam, the disc could be made of metal.

It is to be realized that a different arrangement of openings and/or passages could be provided in the disc, and a different number and/or arrangement of nozzles. In one configuration, the nozzles may be arranged such that fluid passing therethrough will cause the disc to rotate, and it may not be required to provide a motor to drive the disc in such situations.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A cleaning apparatus, the cleaning apparatus comprising:
    a connection part permitting connection to a supply of cleaning fluid; and
    a rotatable member rotatably movable relative to the connection part, the rotatable member being in a form of a disc with an opening within the disc in connection with the connection part to receive cleaning fluid therefrom, with one or more outlets extending from the opening in the disc, to an exterior of the disc, to supply cleaning fluid to an area or item to be cleaned, wherein the rotatable member is made of a plastics material, and wherein the rotatable member is driven by a gear provided on the rotatable member and the gear is drivable by a motor.

2. The cleaning apparatus according to claim 1, wherein the rotatable member includes a central opening with one or more passages extending therefrom, with each outlet extending from a passage.

3. The cleaning apparatus according to claim 2, wherein one or more passages include a plurality of substantially radial passages.

4. The cleaning apparatus according to claim 3, wherein at least one outlet extends from each passage.

5. The cleaning apparatus according to claim 3, wherein the one or more passages include four equispaced radial passages.

6. The cleaning apparatus according to claim 1, wherein the outlets are in form of nozzles to supply a jet of fluid.

7. The cleaning apparatus according to claim 6, wherein the nozzles are configured such that fluid passing therethrough causes rotation of the rotatable member.

8. The cleaning apparatus according to claim 1, wherein the motor is provided on a mounting part of the cleaning apparatus.

9. The cleaning apparatus according to claim 8, wherein the mounting part is configured to permit selective movement of the cleaning apparatus relative to a fixture or mounting assembly.

10. The cleaning apparatus according to claim 1, wherein the motor has a drive gear engageable with the gear provided on the rotatable member.

11. The cleaning apparatus according to claim 1, wherein the rotatable member is made of a polymer.

12. The cleaning apparatus according to claim 1, wherein the plastics material has a working surface temperature of at least 230° C.

13. The cleaning apparatus according to claim 1, wherein the disc has rounded edges.

14. A cleaning equipment for conveyors, comprising:
a frame locatable extending across a conveyor; and
a cleaning apparatus, the cleaning apparatus comprising:
- a connection part permitting connection to a supply of cleaning fluid; and
- a rotatable member rotatably movable relative to the connection part, the rotatable member being in a form of a disc with an opening within the disc in connection with the connection part to receive cleaning fluid therefrom, with one or more outlets extending from the opening in the disc, to an exterior of the disc, to supply cleaning fluid to an area of the conveyor to be cleaned,
- wherein the cleaning apparatus is adjustably mountable on the frame.

15. A cleaning equipment for conveyors, comprising:
a frame locatable extending across a conveyor; and
a cleaning apparatus, the cleaning apparatus comprising:
- a connection part permitting connection to a supply of cleaning fluid; and
- a rotatable member rotatably movable relative to the connection part, the rotatable member being in a form of a disc with an opening within the disc in connection with the connection part to receive cleaning fluid therefrom, with one or more outlets extending from the opening in the disc, to an exterior of the disc, to supply cleaning fluid to an area of the conveyor to be cleaned,
- wherein the cleaning equipment includes a supply of steam to the cleaning apparatus for cleaning the conveyor.

16. A cleaning equipment for conveyors, comprising:
a frame locatable extending across a conveyor; and
a cleaning apparatus, the cleaning apparatus comprising:
- a connection part permitting connection to a supply of cleaning fluid; and
- a rotatable member rotatably movable relative to the connection part, the rotatable member being in a form of a disc with an opening within the disc in connection with the connection part to receive cleaning fluid therefrom, with one or more outlets extending from the opening in the disc, to an exterior of the disc, to supply cleaning fluid to an area of the conveyor to be cleaned,
- wherein the cleaning apparatus is mounted on a robotic arm.

17. The cleaning equipment of claim 16, wherein the cleaning equipment includes a supply of steam to the cleaning apparatus for cleaning the conveyor.

18. The cleaning equipment of claim 16, wherein the rotatable member is made of a plastics material.

* * * * *